United States Patent [19]

Matheson et al.

[11] Patent Number: 5,660,668

[45] Date of Patent: Aug. 26, 1997

[54] LASER INLAY ENGRAVING PROCESS

[75] Inventors: Glenn David Matheson; Norma Catherine Matheson, both of Langley, Canada

[73] Assignee: Inland Laserwave Inc., Langley, Canada

[21] Appl. No.: 438,546

[22] Filed: May 10, 1995

[51] Int. Cl.$^6$ .................................................. B32B 9/00
[52] U.S. Cl. ................... 156/268; 156/298; 219/121.68; 364/474.08
[58] Field of Search ................................. 156/268, 298; 216/28, 39, 94; 219/121.69, 121.67, 121.68; 364/474.08, 474.29, 474.24, 191; 358/444

[56] References Cited

U.S. PATENT DOCUMENTS

| | | |
|---|---|---|
| 3,649,806 | 3/1972 | Konig . |
| 4,126,500 | 11/1978 | Palanos . |
| 4,139,409 | 2/1979 | Macken et al. . |
| 4,486,371 | 12/1984 | Caliri . |
| 4,530,061 | 7/1985 | Henderson ............................ 364/191 |
| 4,918,611 | 4/1990 | Shyu ................................. 364/474.08 |
| 5,103,073 | 4/1992 | Danilov ............................. 219/121.68 |
| 5,204,759 | 4/1993 | Sakai ...................................... 358/444 |
| 5,284,536 | 2/1994 | Gruber . |

*Primary Examiner*—Patrick Ryan
*Assistant Examiner*—Patrick Jewik
*Attorney, Agent, or Firm*—Oyen Wiggs Green & Mutala

[57] ABSTRACT

This invention relates to a novel computerized laser inlay and inlay printing process. More particularly, this invention pertains to a novel process for engraving by use of computer a first excavated image in an inlay base, and secondly engraving a second corresponding relief image on an inlay wafer, and then inlaying the second relief image of the inlay wafer in the first excavated image of the inlay base. A laser process for producing an inlay of one material in another material comprising: (a) electronically scanning an art master and recording a first positive image of the scanned art master in a computer; (b) coordinating a laser cutting beam with said scanned first positive image to engrave a hollow in a base corresponding in shape with said first positive image; (c) producing a second negative image by preparing a negative mirror image of the first positive image and recording the second negative mirror image in the computer; (d) coordinating the laser cutting beam with the scanned second negative mirror image to engrave a relief on an inlay corresponding in shape with the second negative mirror image; and (e) juxtaposing the relief of the inlay with the hollow in the base to form an inlay in the base.

17 Claims, 5 Drawing Sheets

LASER INLAY ENGRAVING PROCESS

FIELD OF THE INVENTION

This invention relates to a novel computerized laser inlay and inlay printing apparatus and process. More particularly, this invention pertains to a novel apparatus and process for engraving by use of computer a first excavated image in an inlay base, and secondly engraving a second corresponding relief image on an inlay wafer, and then inlaying the second relief image of the inlay wafer in the first excavated image of the inlay base.

BACKGROUND OF THE INVENTION

Inlaying one material into another material has been an art in many countries for centuries. Typically, in such inlay art, an excavated inlay pattern is cut in an inlay base, such as a table top or the like, and a matching inlay relief product, usually of a different colour and often of a different material, is cut to coincide with the excavated inlay pattern in the inlay base. The cut relief inlay is then inserted in the engraved inlay pattern in the inlay base. Over the centuries, this inlay art has been highly labour intensive and has required a high degree of painstaking skill from the artisan. To reduce the labour intensity and the level of skill involved, and to improve production rates, a number of techniques have been developed over the years to facilitate the inlay engraving and inlay process.

The following U.S. patents disclose inventions and techniques for forming inlays in wood and other materials.

| U.S. Pat. No. | Inventor | Issue Date |
|---|---|---|
| 3,649,806 | Konig | Mar. 14, 1972 |
| 4,126,500 | Palanos | Nov. 21, 1978 |
| 4,139,409 | Macken et al. | Feb. 13, 1979 |
| 4,486,371 | Caliri | Dec. 4, 1984 |
| 5,284,536 | Gruber | Feb. 8, 1994 |

Palanos discloses a system of making positive and negative forms of an image on two materials and then juxtaposing those two materials together to construct an inlay of one material in the other. Subsequently, the base of the inlay material is sanded or ground away to expose the inlay. Both wood inlays and metal inlays are disclosed. Palanos does not, however, disclose any apparatus for practising his inlay method using laser engraving technique.

Specifically, Palanos uses a laser to selectively form patterns in two pieces of material by vaporizing unwanted portions thereof. One piece of material has the negative pattern of the other piece of material. The patterns do not completely penetrate the thickness of the pieces. A suitable adhesive is applied to the two pieces of material and they are then mated together so that the raised non-vaporized area of one piece mates with the vaporized area of the other piece. When the adhesive is set, one surface is sanded or planed until the thickness of the two joined pieces is reduced to reveal the area where the two pieces have been mated.

Macken et al. disclose a method for forming a raised metallic relief involving a metal foil sheet affixed to a support film which is selectively etched. The film is affixed to a wood surface and then exposed to a laser beam to vaporize the support film and wood in areas unprotected by the metal foil sheet.

A major longstanding problem in the inlay art is the competing objectives of having the edges of the inlay coincide as closely as possible with the edges of the inlay base, so that the margin between the inlay and the inlay base is as thin as possible, balanced with leaving sufficient space in the margin, and under the inlay, to permit the presence of an adhesive which binds the inlay and the inlay base together.

Another major longstanding problem has been the difficulty usually involved in getting the inlay to penetrate readily into the inlay base. Often, particularly with complex inlay patterns, the outline of the inlay does not precisely match the outline of the excavated area in the inlay base. Thus a considerable amount of trial and error is required in fitting the two pieces together. This procedure often results in the inlay splitting or breaking, or the edges of the inlay, or the edges of the engraved area in the inlay base, becoming chipped, frayed, or damaged. In such cases, the inlay is of lower quality, or the inlay and/or the inlay base must be discarded and a new inlay and or inlay base cut.

A further longstanding problem is the difficulty experienced in having the inlay penetrate to a consistent depth in the engraved area of the inlay base. In many situations, for example, with a wood inlay of attractive hardwood(s), the grain pattern of the inlay hardwood is highly important to the overall attractiveness of the inlay wood product. If the inlay is not of a consistent depth, and a portion of the wood inlay is subsequently sanded away, an uneven or unattractive "wave-like" appearance can result in the grain of the inlay wood. In many cases, this "wave-like" appearance in the grain is undesirable. To avoid the appearance of a "wave-like" pattern in the wood grain of the inlay material, it is important that the depth of the wood inlay material in the wood base is consistent over the entire engraved area of the wood base. In that way, subsequent sanding of the wood inlay product cuts a consistent plane across the entire surface of the wood inlay product and reveals a consistent "wave-free" grain pattern.

A further problem inherent in to inlay products and engraved areas in wood inlay bases using a laser is that the laser usually leaves a small charred area along the margin between the inlay and the inlay base. This charred margin is unsightly. Furthermore, the charred margin prevents good adhesion between the adhesive interface between the inlay and the inlay base.

Yet a further problem in the inlay art is the difficulty inherent in doing multiple laser inlays of different woods or materials in one design without spoiling the previous inlays.

To date, laser inlay processes have been slow and uneconomical. Laser inlay has been done in the past by several methods:

Laser cutting veneers and individually placing the veneers in the excavated inlay. This process is slow and expensive.

Defining an inlay pattern on a piece of material, and a negative pattern on another piece of material, engraving one pattern and embossing the other, then mating the materials together and sanding down the backing to expose the inlay. This process usually involves carefully enlarging the engraved pattern to allow the embossed image to fit. While it is possible to produce intricate inlays in this way, the process is slow and cannot be used in an economical high production process.

The use of wood and metal is another variation of laser inlay process where the inlay is affixed to a metal plate, and the wood engraved out with a pattern. An embossed composite of the pattern is then joined to the inlay and the plate removed. This process, too, is slow and difficult.

SUMMARY OF THE INVENTION

The invention is directed to a laser process for producing an inlay of one material in another material comprising: (a) electronically scanning an art master and recording a first image of the scanned art master in a computer; (b) coordinating a laser cutting beam with said scanned first image to engrave a hollow in a base corresponding in shape with said first image; (c) producing a second image by preparing a mirror image of the first image and recording the second image in the computer; (d) coordinating the laser cutting beam with the scanned second image to engrave a relief on an inlay corresponding in shape with the second image; and (e) juxtaposing the relief of the inlay with the hollow in the base to form an inlay in the base.

The first image can be printed and the printed first image can be scanned by an optical reader which can control the laser beam which can engrave a hollow in the base. The second image can be printed and the printed second image can be scanned by an optical reader which can control the laser beam which can engrave a relief of the inlay. The electronically scanned image of the art master can be sharpened by software in the computer, and a text font can be added to the scanned image.

The base can be mounted on a variable speed work table positioned under the laser beam, the movement of said work table being coordinated with the optical reader. The laser beam can engrave the relief in two stages, the laser beam being de-focused during the first stage of engraving a partial depth of the relief of the second image. The laser beam can be focused after the de-focused partial depth engraving is completed, and a full-depth engraving of the relief of the second image can be made.

The inlay can be an inlay wafer and the relief can be engraved on one side of the wafer. The edges of the relief on the inlay wafer can be trimmed, sanded, and adhesive can be applied to the relief before the relief on the inlay wafer is juxtaposed in the hollow in the base. A foundation of the relief on the inlay wafer, and a partial depth of the surface of the base can be removed after the relief of the inlay wafer has been juxtaposed in the groove in the base, thereby revealing an inlay image in the inlay base.

The partial depth of the first stage of engraving of the relief on the inlay wafer can have a tapered profile and a slight rounding of surface edge. The angle of taper of the partial depth can be greater than the angle of taper of a lower portion of the relief engraved during the second stage. The floor of the hollow engraved in the base can have thereon a glue escape recess.

In the process, a first hollow can be engraved in a base and a first relief of an inlay can be engraved, the relief can be juxtaposed in the hollow, a portion of the relief extending above the surface of the base can be sanded away, and a second hollow corresponding in shape with a second positive image can be laser engraved in the base, a second inlay relief corresponding in shape with a second negative mirror image and the second relief can juxtaposed in the second hollow.

A portion of the first inlay, a portion of the second inlay and a corresponding portion of the surface of the inlay base can be sanded to expose a uniform level of inlay and base.

The invention is also directed to a laser inlay engraving and printing apparatus comprising: (a) an electronic image scanner; (b) a computer electronically connected to the scanner; (c) a laser printer connected to the computer, and an optical reader which reads an image printed by the laser printer and transmits it to a laser beam generator; and (d) a variable speed work table electronically connected to the computer for coordinating the scanner with the laser beam generator. The laser beam generator can include a focusing/de-focusing feature. The apparatus can include a precise surface depth thickness sander.

The invention is also directed to a laser inlay process comprising: (a) scanning an art master and recording the scanned art master in a computer; (b) printing a copy of the computer stored art master to produce a first image; (c) scanning said first image with an optical reader; (d) coordinating a laser with said optical reader to cut an engraving in a base corresponding with said first image; (e) producing a mirror image of the computer stored art master; (f) printing a copy of the mirror image to produce a second image; (g) scanning said second image with the optical reader, said optical reader being reversed compared to the reading of the first image; (h) engraving on an inlay wafer an image which corresponds with the second image; and (i) juxtaposing the inlay wafer with the reproduction of the second image in the engraving corresponding to the first image in the inlay base.

An exposed portion of the inlay relief and a portion of the surface of the inlay base can be sanded away to reveal a uniform level of inlay relief and inlay base.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
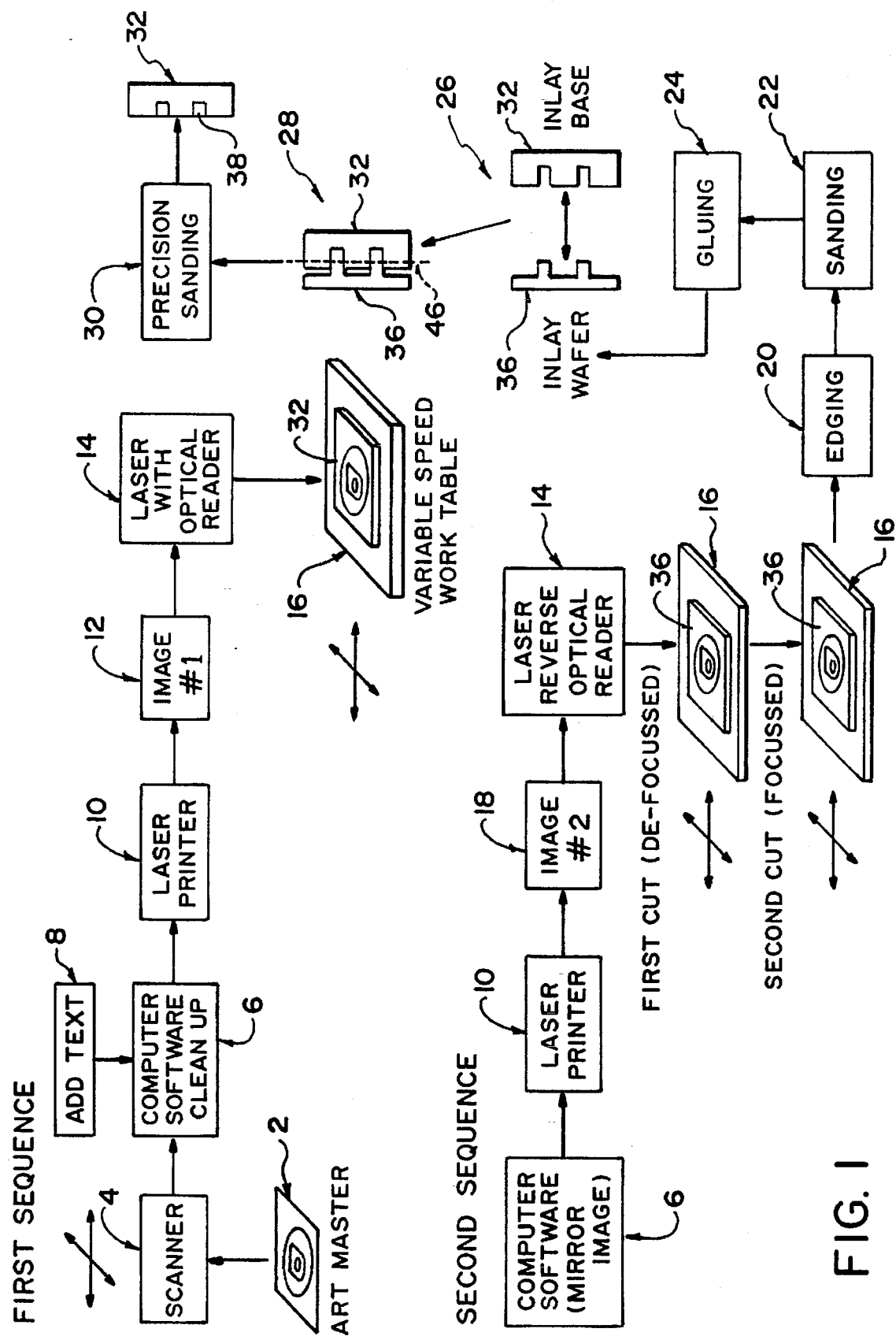
FIG. 1 illustrates a schematic flow sheet of the various steps employed in practising the laser inlay process of the invention.

This invention is a computerized laser inlay engraving and printing process whereby the precise accuracy of computer developed text and graphics is combined with a state-of-the-art laser engraving system to enable efficient high speed precision inlay and printing products to be produced. The process has the ability to change inlay text and art while at the same time achieving the speed and efficiency necessary in a production process. The process of the invention is designed to inlay corporate logos, text and graphics on awards, signage, architectural inlays, gifts and other commercial applications. Extraordinary quality, process reliability and economy are achieved.

Inlay Engraving and Printing Process

The mirror image that is required to create the inlay is a true mirror image. That is to say, the image 1 is held up to a mirror and the image in the mirror is examined, it is that image in the mirror that is required for image 2. The image 2 that is reflected in the mirror will have the lettering backwards, and what is on the right of image 1 will appear on the left in the mirror image 2. This image 2 in the mirror, however, must be converted to a negative, so that it will fit into image 1. At that point, it becomes a negative mirror image. The negative mirror image must be exact, with no distortion, for the process of the invention to work satisfactorily.

It is that mirrored negative image that must be created to form the inlay, because the engraving laser beam cuts an edge that is always slightly tapered, rather than perpendicular. Because this edge is tapered, it is not possible to simply excavate a pattern in the base, then cut a piece to fit the patterned excavation from a negative of the same image. The reason it will not fit is because the tapered edges are reversed and the pattern will not fit. The mirrored negative image, however, can be inverted so that the tapered edges fit.

There are several ways to create this mirrored negative image using the computer and laser equipment employed in this invention. The first two methods as described below are preferred using the equipment and process described.

The mirror image can be created by placing an image on the scanner and transporting it into software that will project it on the computer screen. It is then "cleaned up" and alterations or text added. Then the software is commanded to "mirror" the image. The original image and the mirrored image will then appear on the screen and can be printed simultaneously. This is preferable for small images where both images can appear on the same sheet. The mirror image will then be converted to "a negative" by the optical reader, during the laser engraving process to form the relief on the inlay wafer.

Alternatively, for larger images, the image is placed on the scanner and it is transported into computer software that will project it on the computer screen. It is cleaned up and alterations or text are added. Then that image is printed on the printer. The computer software is commanded to mirror the image and position it so that it will print on the printer. Then the mirror image is printed separately. The mirror image is then converted to "a negative" by the optical reader, during the laser engraving process.

As a further alternative, either of the prior two methods can be performed except that at the point that the mirror of the image is made, the software is commanded to create a negative mirror image. This replaces the need to use the reversing feature of the optical scanner. This application would be practical where the laser is interfaced directly with the computer.

The mathematical grid of the computer screen is critical to all methods, with the facility of high dpi resolution that enables precise mirroring without distortion.

Referring to the schematic flow sheet illustrated in FIG. 1, selected line art image, or art master, 2 is according to a first sequence scanned with a scanner 4, transferred electronically to a computer screen 6, where it is software enhanced and formatted. Text 8 is also added and the cleaned up composite is printed on a high resolution laser printer 10. Using a $CO_2$ laser 14 with adjustable power controls, this laser printed image 12 is then scanned by a reversible sensor or optical reader 14 that "reads" the image. The inlay base 32 is positioned on an independently controlled variable speed work table which moves along X and Y axes, and is part of the integrated laser engraving system. The integrated laser engraving system precisely controls the laser engraving cut on the inlay base 32 to be inlay engraved and printed. The "floor" of the engraved inlay base 32 is then grooved with fine engraved lines using a "skip" control system which enables single lines to be cut at ¼" intervals (see FIG. 5 for more detail). This ensures a strong bonding surface for the inlay.

Next, according to a second sequence, the scanned image is "reverse mirrored" with absolute accuracy on the computer's mathematical grid screen 6. By reversing the laser's light sensor (optical reader) 14 and adjusting the engraving speed, this negative mirror image is then relief engraved on an inlay wafer 36, by two separate, controlled relief engraving cuts to form the reverse relief image on the inlay wafer 36. The first and second cuts are explained in more detail below in relation to FIG. 6. The inlay wafer 36 is then edged, sanded and glued before being mated and bonded into the matching excavation of the first image in the inlay base 2 with a hydraulic wood press (not shown) so that it seats firmly into place in the inlay base 32. Excess material is removed from the inlay wafer 36 and inlay base 32 to a specified depth and the mated inlay is then polished to a furniture finish. The joined edges of the inlay fit consistently at a variance of less than 0.001 of an inch, enabling extremely fine detail and predictable quality, while enabling continuous change of text and graphics during a production run.

Detailed Description of Equipment and Process of Invention

Using a 1200 dpi colour art scanner 4, any graphic art, logo line art picture or text 2 is then scanned and transferred in line art to the computer screen 6. An Arvec 1200 dpi colour art scanner with ArcSoft Photo Studio software by ArcSoft Inc., 1512 Centre Pointe Drive, Milpitas, Calif., has been successfully used for this purpose. This equipment is used for imparting graphics into the computer.

The image is then transported to specific software in the computer 6 where it is "cleaned up" (the pixels on the edges of the image are smoothed). (Corel Draw 4™ and Paintbrush™ were used for this function.) Text 8 can then be added to the image using a myriad of fonts available in computer software stores. (Corel Draw™ and Microsoft Word™ were used.) A suitable computer and software are a Leading Edge Win Pro 486e Computer with 12 megabytes of RAM and CD-ROM available from Leading Edge Products Inc., 117 Flanders Road, Westborough Mass., with Corel Draw 4 software, by Corel Corporation, 1600 Carling Avenue, Ottawa, Ontario. Microsoft Office, Microsoft Word, Paintbrush software are widely available from Microsoft Corporation, Bellevue, Wash.

The cleaned up text-added electronic image is then printed on a 600 dpi laser printer 10. A 600 dpi laser printer, Laserjet 4p, by Hewlett Packard Co., P.O. Box 15, Boise, Id., was used for this step. This becomes IMAGE 1 (see example of IMAGE 1 in FIG. 2), ready for laser engraving on the inlay base product to be inlaid.

An 80 watt $CO_2$ laser 14 with power adjustment controls and a laser engraver equipped with an optical sensor that can "read" black, or be reversed and read "white", and a variable speed work table 16 to control the depth of laser cut, and a "skip" control system is used for engraving IMAGE 1 in the inlay base. A Laser Apollo 80 watt $CO_2$ by Apollo Lasers of California was used successfully. Laser Control electronics by Apollo Lasers is a subsidiary of Patlex Corp. of California (purchased through LMI). Suitable laser engraving equipment is available under the trade-mark Lasergrave™.

The laser engraver must be equipped with a reversing light sensor "reader", a "skip" control system to engrave skipped lines, and an indexed, electromagnetic clutch table reverser. Lasergraver is manufactured by Laser Machining of 500 Laser Drive, Sommerset Wis.

The laser is set to engrave the inlay base, usually wood, but it can be a plastic such as acrylic or some other suitable engravable material, at a depth of 1/8". An example of the engraved inlay base is illustrated by the black IMAGE 1 shown in FIG. 4. It is important to note that laser power settings are important to the success of the engraving process. In some inlay base materials, it is necessary to reduce the power of the laser. Similarly, a variable speed, indexed worktable 16 under the laser 14 is essential for setting depth of cut, and precision of cut. The focusing of the laser 14 is equally important to ensure a clean, precise cut. Once all the settings are complete, however, quality is assured by practising the invention. The density of wood and other materials vary, requiring different settings for different materials.

A "skip" control that enabled engraving of single lines at 1/4 inch intervals on the "floor" of the inlay base engraving is satisfactory. This can be done quickly without changing the artwork or settings (see FIG. 5). It is important to note that to ensure a strong bonding surface for the inlay in inlay base, there must be an escape area in the excavation in the inlay base for the glue to enter as the inlay wafer is later forced tightly down into the excavated area in the inlay base. This is because the inlay fit using the invention is so tight that excess glue cannot escape between the intersections between the inlay wafer 36 and the inlay base 32. Compression of the inlay wafer and improper seating of the inlay can occur if these deeper lines (escape voids) are not cut.

Once the inlay base 32 is laser excavated with the first image, the engraved inlay base 32 is then cleaned and set aside, awaiting the inlay of the inlay wafer 36. If coarse wood grain has caused uneven depressions on the base, these can be quickly levelled with wood filler to ensure consistent depth of the excavation.

Figure 2:
FIG. 2 illustrates a sample positive image #1.
Figure 3:
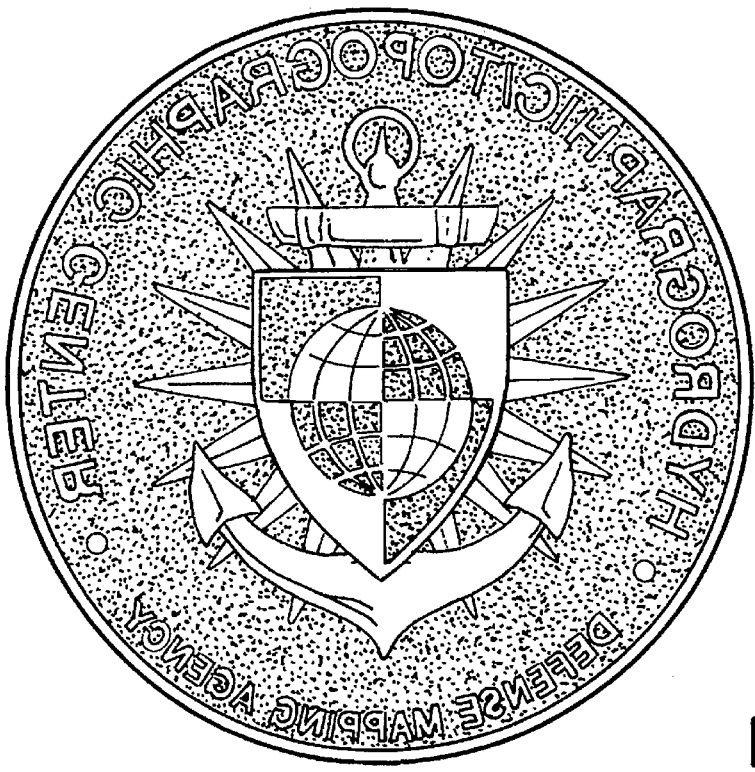
FIG. 3 illustrates a sample "mirror" image #2.

The inlay wafer 36 is relief engraved according to the second sequence (see FIG. 1). The image in computer 6 is "mirrored" at 600 dpi, thereby creating IMAGE #2, and printed using the 600 dpi laser printer 10. The mathematical grid screen of the computer program 6 enables exact mirroring of the art in seconds with 600 dpi accuracy and no distortion (unlike copiers and printers of prior vintage). The IMAGE 2 example illustrated in FIG. 3 gives a good demonstration of how the "mirrored" IMAGE 2 appears and relates to IMAGE 1 in FIG. 2. We have found using the process and equipment of the invention that text and graphics can be changed quickly as multiple personalized products are programmed for laser inlay printing.

The light sensor "reader" 14 is reversed to cut white and the reverse art is set up in the laser 14 to make two separate cuts on the inlay wafer. On a 5/16" thick inlay wafer 36 of wood contrasting to the inlay base, the negative mirror image is engraved in relief to a depth (or height) greater than the depth of the excavation in the wood base 32, using two successive controlled cuts. The first relief engraving is cut 3/32" deep with the laser 14 de-focused. The focus of the laser is 3/32" longer than normal. This cuts the image lines wider than normal, thereby resulting in all of the edges of IMAGE 2 (FIG. 3) being shaved slightly narrower than those of IMAGE 1 with slight rounding of surface edges (FIG. 2). This de-focused cut facilitates an easy joining of the inlay of the wafer 36 into the engraved cavity) of inlay base 32.

Failure to do this first cut results in the inlay of the inlay wafer 36 having to be forced into the engraved cavity of the inlay base 32, as both IMAGE 1 and IMAGE 2 which guide the laser, are virtually identical in size except for mirroring. (An alternate and unacceptably tedious way of accomplishing an easier fit could be to remove two pixels from all edges of the mirror image 18. Needless to say, this option is impractical in a production process.)

Next, the laser 14 is re-focused correctly and a second engraving cut is made, this time engraving the exact edges of the mirror image 18 and cutting a further relief depth of 1/8". The full depth of the relief inlay is now 7/32" (see FIG. 6). It can be seen in the FIG. 6 that the edges of the engraved relief of inlay wafer 36 have been effectively sculptured to provide a somewhat tapered configuration which facilitates easy entry of the inlay 38 portion of the inlay wafer base 36 into the engraved cavity 34 in the wood base 32. It is important to note that the laser 14 cuts a slightly tapered edge of 4 or 5 degrees and that this taper is increased during the first de-focused cut to about 6 to 8 degrees from vertical (see FIG. 6). It can be seen from FIG. 7 that this taper actually improves the inlay fit as the two pieces are pressed together. The best fit, that is, the part of the engraving cut 34, which meets relief engraving 38, is about 1/16" below the surface of the engraved wood inlay base 32. To reach this level of best fit, the excess material of the inlay wafer 36 and the inlay base 32 are removed to what is referred to as finished surface depth (see FIGS. 6 and 7.) The depth of the relief engraving 38 of the inlay wafer 36 is cut 3/32" deeper (or higher) than the depth of the engraving 34 of inlay base 32, to thereby leave a slight surplus of material. This includes a space between the inlay wafer 36 and inlay base 32 to thereby allow firm seating of the inlay wafer 36 when it is pressed in place in the excavation of inlay base 32.

It will be understood that the specific dimensions mentioned above can be varied as the situation requires. The dimensions are given mainly for the purpose of illustrating one embodiment of the invention. As an alternative process to the one described above, the reversing feature of the "reader" on the laser 14 can be bypassed by creating a negative (as opposed to a positive) mirror image in the computer 6, and then printing and engraving this negative mirror image directly on the inlay wafer. However, with this procedure, sculpturing of the edges was found to be more difficult.

Before the inlay wafer 36 is mated with inlay base 32, the rough edges of the inlay wafer 32 are removed by a jigsaw during step 20. The exposed negative relief image 33 is then lightly sanded during step 22 to ensure that all engraving residue is removed from the surface of the relief image 38. Otherwise, the glue applied in step 24 will not bond well to the surface of the relief image 38.

The bonding material (glue) is applied to the exposed surface of the relief 38 of the inlay wafer 36 during step 24 and the two images 34, 38 of the wafer 36 and base 32 are pressed together with a hydraulic wood press. The juxtaposed wafer 36 and inlay base 32 are then clamped for 12 hours until the glue has set. (See FIG. 3 for concept and FIG. 7 for detail.)

Excess inlay wafer 36, and 1/32" of the surface of the inlay base 32 being inlaid is removed with a Preformax™ thickness sander (precise surface depth sanding) (see step 30 in FIG. 1) to the precise level of the surface finish depth indicated by dotted lines in step 28. The precision of the thickness sander is essential to ensure precise product duplication to very tight thickness specifications. Too much sanding removes part or all of the inlay printing. Too little sanding results in an uneven inlay surface. Precise sanding off of the inlay wafer 36 only to the surface level of the base, allows multiple inlays of different woods to be inlaid in the same pattern in the base. When the multiple inlays have been completed, then the inlay base 32 is sanded to the finished surface depth 46 (see FIG. 7). Fine sanding and polishing prior to finishing facilitates a fine furniture finish.

It is important to recognize that since this process requires triple pass engraving to produce the finished inlay product, it requires effective cost control. To accomplish this, we have found it helpful to reduce $CO_2$ consumption by the laser 14. This has been done by installing a laser gas recycler on the laser 14 to increase production from each tank of $CO_2$ gas. This recycler (not shown) enables ten times the production from each tank of laser $CO_2$ gas. The recycler is a Model 100B made by Optical Engineering, 3300 Coffey Lane, Santa Rosa Calif.

FIG. 2 illustrates a sample positive image #1. Image #1 as illustrated in FIG. 2, is very intricate and is a good example of the detailed precise inlay that is possible with the subject invention. Such an intricate image could not be easily converted to inlay by systems known in the prior art. Even so, such systems would be extremely expensive, and of slow production rate, because of the detail and fine work involved.

FIG. 3 illustrates a sample "mirror" image #2. Image #2, illustrated in FIG. 3, is a "mirror" reverse image of Image #1, illustrated in FIG. 2. As can be seen, not only is the globe on the shield in the centre of Image #2 reversed, but also the lettering around the circumference.

Figure 4:
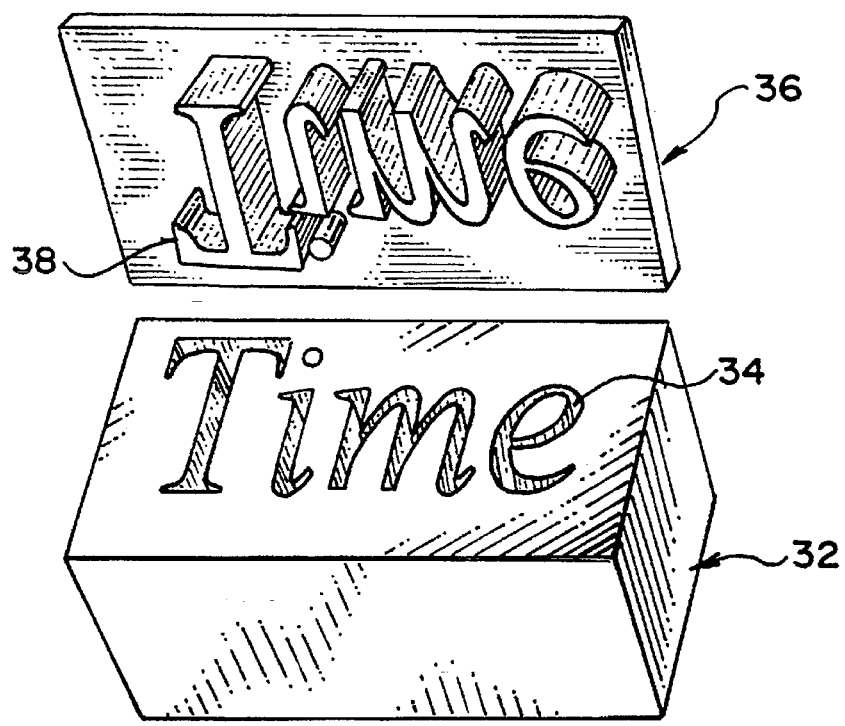
FIG. 4 illustrates a stylized isometric view of an inlay wafer ready for juxtaposing with a corresponding inlay base.

FIG. 4 illustrates a stylized isometric view of an inlay wafer ready for juxtaposing with a corresponding inlay base. As seen in FIG. 4, inlay base 32 has the word "Time" 34 engraved in the inlay base 32, typically to a depth of 1/8". A crest and the words "Hydrographic/Topographic Center-Defense Mapping Agency" is the image shown for Images 1 and 2 in FIGS. 2 and 3 respectively. However, in FIG. 4, Image 1 is the word "Time". One reason why Image 1 shown in FIG. 4 is different from Image 1 shown in FIG. 2 is to illustrate the versatility of the invention. Another reason is that for purposes of illustration in FIG. 4, a more simplified Image 1 was desirable.

In FIG. 4, the inlay wafer 36, with the word "Time" 38 engraved thereon in relief, and the inlay base 32, with the word "Time" engraved in depth 34, are laser cut according to the process of the invention to coincide precisely with one another. Typically, as explained previously, the height of the relief letters 38 on inlay wafer 36 are slightly greater than the depth of the engraved letters 34 in inlay base 32. For example, if the depth of the letters 34 in base 32 is 1/8, the height of the relief letters 38 in inlay wafer 36 will be 7/32.

Figure 5:
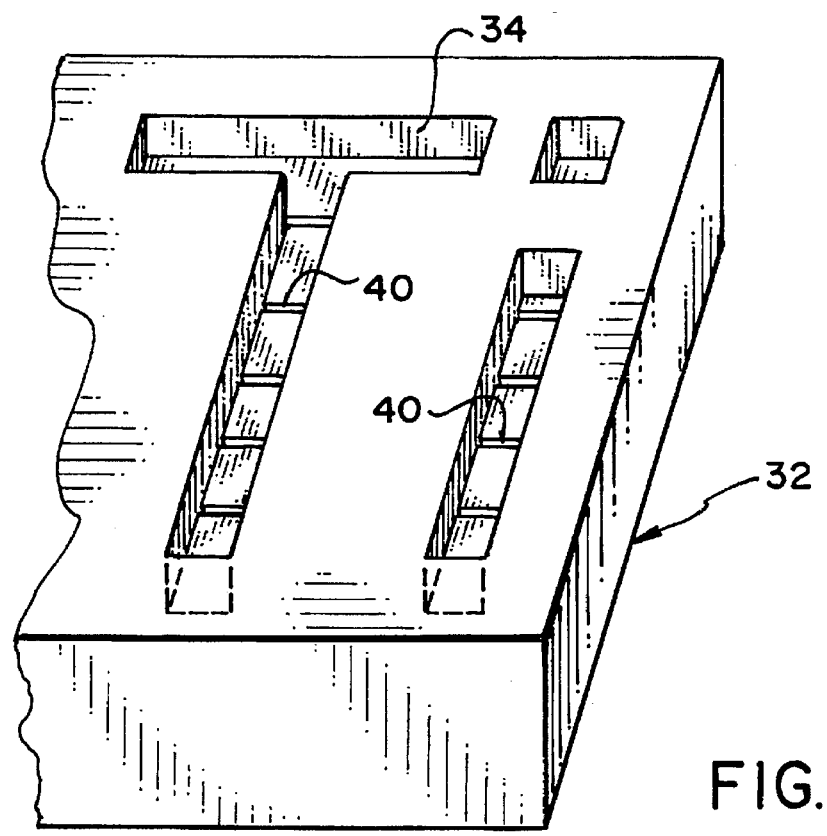
FIG. 5 illustrates an isometric view of a laser excavated inlay base, illustrating in particular the periodic glue lines cut in the floor of the laser engraved area in the inlay base.

FIG. 5 illustrates an isometric view of a laser excavated inlay base, illustrating in particular the periodic glue lines cut in the floor of the laser engraved area in the inlay base. FIG. 5 illustrates of an inlay base 32 which has the letters "T" and "i" engraved in it by using the process of the invention. Deeper lines 40 are engraved at periodic intervals, for example, 1/4 intervals, on the floor of the engraved cavity 34. These grooves 40 accept excess glue or adhesive as the matching relief letters 38 of inlay wafer 36 are pressed into the corresponding engraved letters 34 in the inlay block 32. In this way, there is a certain amount of excess space in the excavation into which glue can migrate, thereby ensuring that the circumferential intersections between the relief letters 38 on the inlay wafer 36 and the engraved letters 34 on the inlay base 32 achieve a snug fit with one another. The deeper lines 40, or grooves, can be cut by using a "skip" control on the computer automated laser 14. These grooves 40 are quickly engraved without changing the art or the process set-up.

Figure 6:
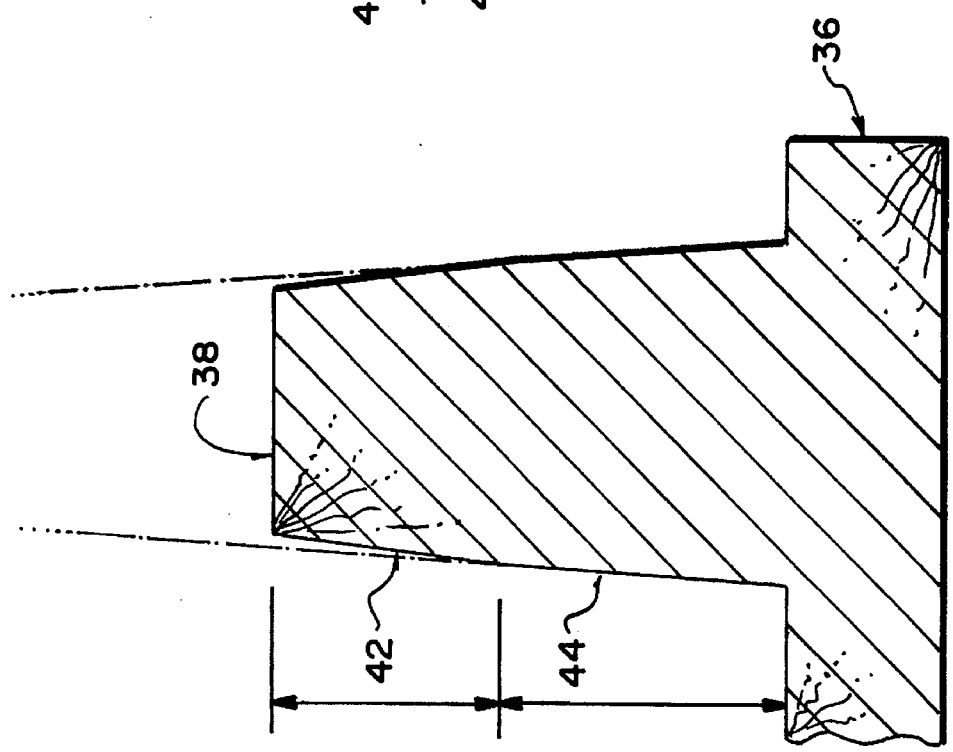
FIG. 6 illustrates a side section view of a raised profile of a laser engraved inlay wafer.

FIG. 6 illustrates a side section view of a laser engraved inlay wafer 36 with relief letter 38. The relief letter 38 is cut in two stages as explained previously in association with FIG. 1. The first or "top" cut 42 is laser engraved with a de-focused laser beam and typically extends slightly less than halfway down the height of the relief letter 38. The second or "bottom" cut 44 is laser engraved with a focused laser beam. As can be seen from the profile of the relief letter 38 in FIG. 6, the top portion 42 of the letter 38 has more tapered walls. These are typically 6 to 8 degrees off the vertical. This is achieved using a de-focused laser 14. This tends to burn away or volatilize the material from the inlay wafer at more of an angle. The second cut 44, using a focused laser beam, has less taper, typically 4 to 5 degrees from the perpendicular. The relief letters 38 on the inlay wafer 36 mate with the engraved letters 34 in the inlay base 32, because the walls of the second cut 44 are also slightly tapered (4 to 5 degrees), and match the second cut of the inlay base 32. As can be seen in FIG. 6, they are of a smaller angle than the taper of the first cut.

Figure 7:
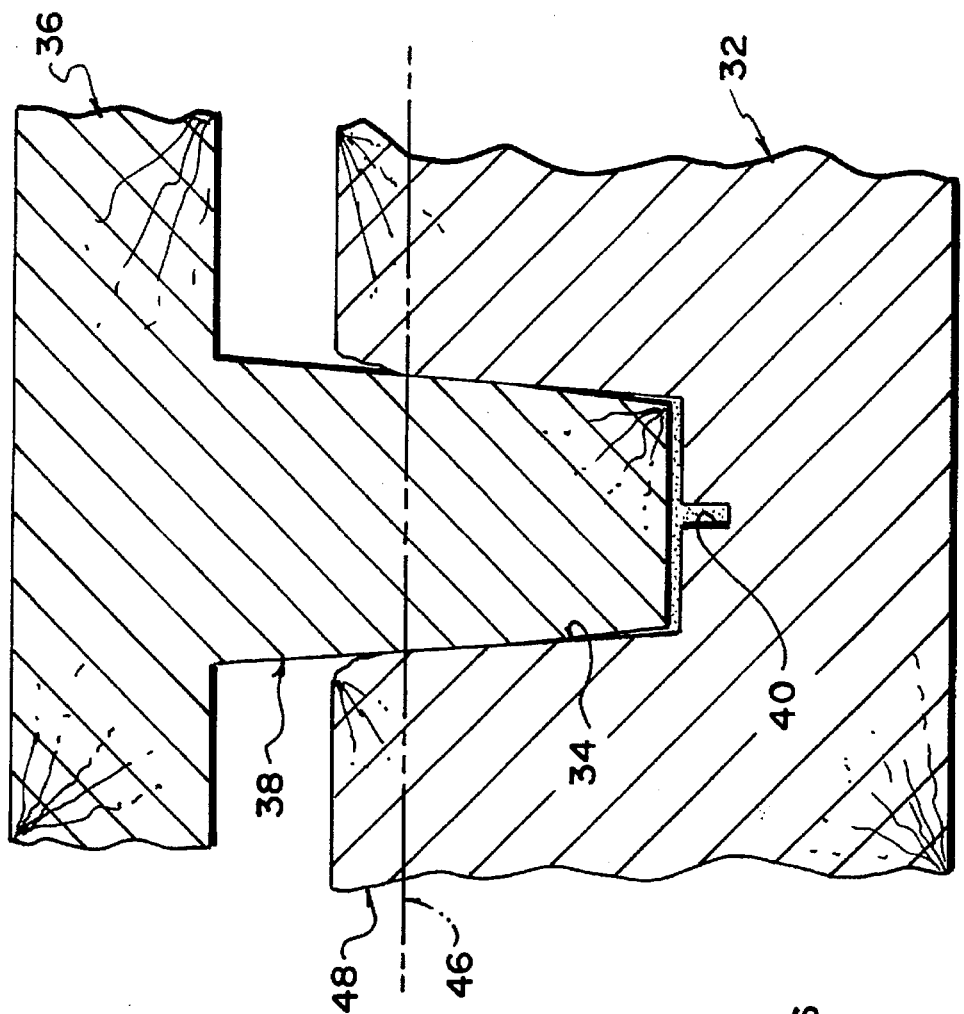
FIG. 7 illustrates a side section view of the raised profile of an inlay wafer inserted into a corresponding excavated groove in an inlay base.

FIG. 7 illustrates a side section view of an inlay wafer 36, with relief letter 38, inverted compared to the configuration illustrated in FIG. 6, and mated with a corresponding engraved groove 34 in inlay base 32. Glue escape groove 40 or slot 40 is shown formed in the bottom of engraved groove 34. As explained previously, groove 40 provides an excess glue void so that any excess or surplus glue can be contained in the groove 34, and is not forced by pressure up the walls of the very tight intersection between the engraved groove 34 and the relief letter 38. In this way, relief letter 38 of inlay wafer 36 can be pressed evenly into groove 34, throughout the entire area of the inlay wafer 36, to form a uniform plane.

Also, the liquid glue is applied so that it levels out any depressions in the floor of the inlay base 32. This prevents any ripple or wave effect in the wood grain of the inlay when it is finally sanded. Heavily grained wood such as oak requires larger areas of the base excavation to be quickly levelled with wood filler prior to glue-up to ensure consistent depth of the excavation and to prevent future ripple effect when the inlay is finished and sanded.

Once the relief letter 38 of inlay wafer 36 has been pressed into place in groove 34 of inlay base 32, and the glue has set, the base portion of the inlay wafer 36 and a certain portion of the base of the relief letter 38, together with a certain adjacent portion 48 of inlay base 32 are sanded or machined away along plane 46 by a precision depth sander. This step leaves only the inlay in the base visible to the eye. It should be noted that the tight interface between relief letter 38 and groove 34 at plane 46 is achieved by the tapered sculpturing of the letter 38 and the groove 34. This keeps the glue contained. The point of tightest fit between the relief letter 38 of inlay wafer 36 and the groove 34 of inlay base 32 is also the part that exists at plane 46. Thus, when the material above plane 46 is sanded away, only the thinnest line of intersection is visible to the eye.

Where multiple inlays of different woods or other materials are used in one inlay design, the inlay wafer can be removed to the base surface only. Then, after other inlays have been completed and removed to base surface level, a partial depth of the inlay base surface, and the multiple inlays, can be removed.

It should also be noted in FIG. 7 that the upper corner intersections between groove 34 and the flat top surface of inlay base 32, which are prone to being damaged due to charring from the laser beam, or notching or fraying when the relief letter 38 of the inlay wafer 36 is fitted into the corresponding grooves 34 of inlay base 32, are sanded away. This ensures that the thinnest possible intersection between the inlay 36 and the wood inlay base 32 is visible to the naked eye. In this way, the finest quality inlay, with highly intricate designs, can be achieved, at commercially economical production rates, using the process of the invention.

Multiple woods can be inlaid in one design by blanking out various features of the art master where a different wood or different material is to be inlaid, and repeating each step of the complete inlay process up to, but not including the point where the base is sanded to finish surface depth. In this case, only sand to the surface of the base after each successive inlay, and after all inlays are complete, then sand to finish surface depth to expose all inlays in their best possible fit.

Figure 8:
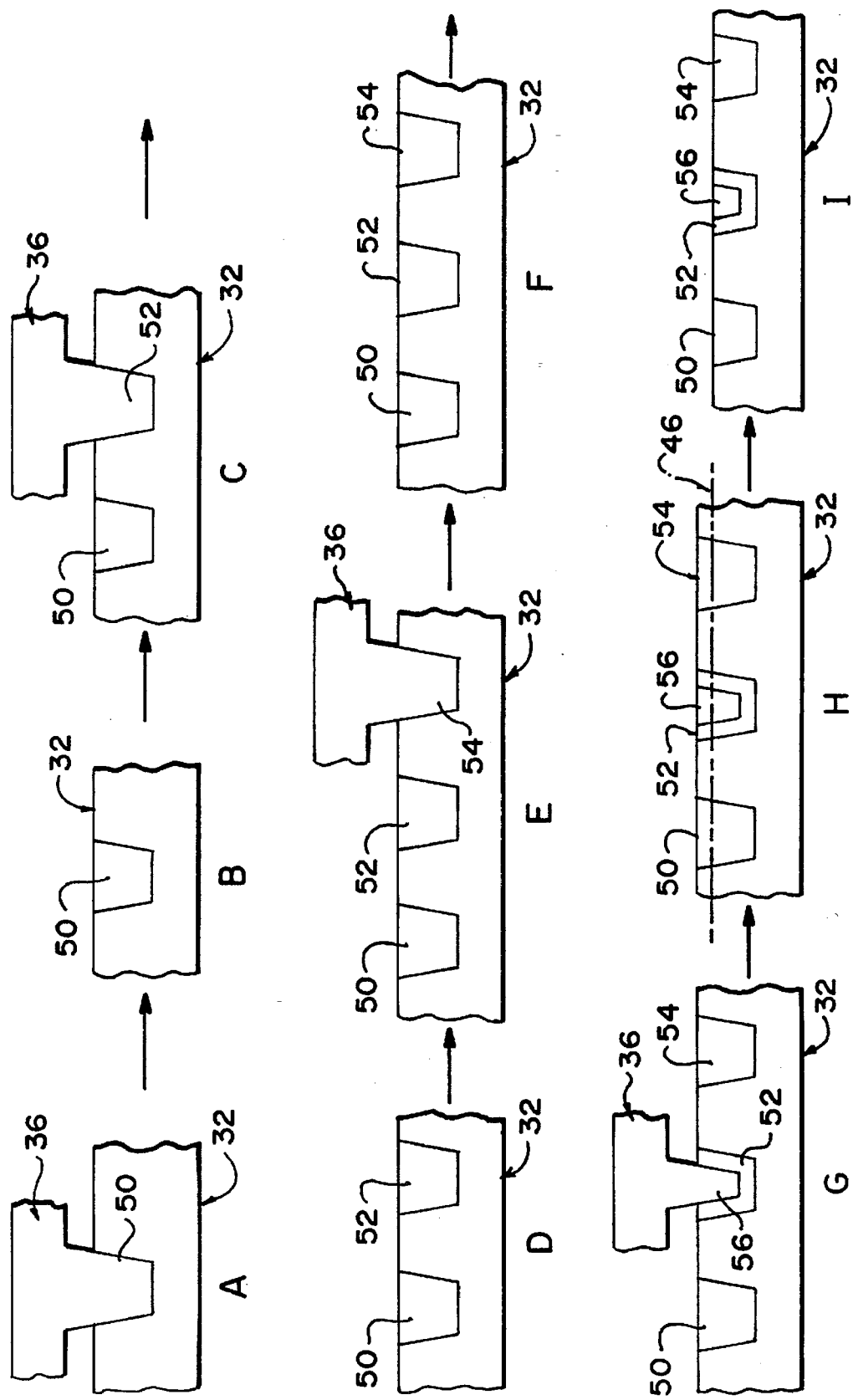
FIG. 8 illustrates in schematic side section views a method of making multiple inlays of different materials.

FIG. 8 illustrates in schematic side section views a method of making multiple inlays of different materials. The sequence illustrated schematically in FIG. 8 comprises three main inlays 50, 52 and 54, with an "inlay within an inlay" 56 in central inlay 52. Specifically, as illustrated in FIG. 8(a), a first inlay 50 comprising inlay base 32 and inlay wafer 36 is constructed. Then, as seen in step (b), the inlay wafer 36 is sanded away until inlay 50 is level with the top surface of inlay base 32. Subsequently, as illustrated in FIG. 8(c), a second inlay 52 is formed in inlay base 32 by inverting a second laser wafer 36 and inserting it in the engraving 52 in inlay base 32. Then, as seen in step (d), the second laser wafer 36 is sanded away until inlay 52 is level with the top surface of inlay base 32. The process is repeated a third time to construct a third inlay 54 as seen in step (e) of FIG. 8. Subsequently, the third inlay wafer 32 is sanded away until inlay 54 is level with the top surface of inlay base 32. At this point, three inlays 50, 52 and 54 are constructed in the inlay base 32, and the respective inlays 50, 52 and 54 are sanded so that they are level with the top surface of inlay base 32. Subsequently, an inlay within an inlay 56 is constructed in central inlay 52 as illustrated in step (g) of FIG. 8. Then, as illustrated in FIG. 8(h), the main body of fourth wafer 36 making up inlay 56, is sanded away until it is level with the top surface of inlay base 32. Finally, after all the multiple inlays have been completed, portions of the tops of inlays 50, 52, 54 and 56, together with a small portion of the top surface of inlay base 32, are sanded away to the level illustrated by dotted line 46 in FIG. 8(h). The result is a multiple inlay as illustrated in FIG. 8(i).

It will be understood that the multiple inlay sequence illustrated in FIG. 8 is merely illustrative of one type of multiple inlay that can be performed. It will be recognized that the number of multiple inlays made ranges from two to virtually any number of multiple inlays. Furthermore, "inlays within inlays" can also be made, using the apparatus and process of the invention. Thus, it is possible to construct single and multiple inlays of high complexity and accuracy using the apparatus and process of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is calimed is:

1. A laser process for producing an inlay of one material in another material comprising:

(a) electronically scanning an art master and recording a first positive image of the scanned art master in a computer;

(b) coordinating a laser cutting beam with said scanned firsts positive image to engrave a hollow in a base corresponding in shape with said first positive image;

(c) producing a second negative image by preparing a negative mirror image of the first positive image and recording the second negative mirror image in the computer;

(d) coordinating the laser cutting beam with the scanned second negative mirror image to engrave a relief on an inlay corresponding in shape with the second negative mirror image; and (e) juxtaposing the relief of the inlay with the hollow in the base to form an inlay in the base.

2. A process as claimed in claim 1 wherein the first positive image is printed and the printed first positive image is scanned by an optical reader which controls the laser beam which engraves a hollow in the base.

3. A process as claimed in claim 1 wherein the second mirror image is printed and the printed second mirror image is scanned by an optical reader which converts positive to negative and controls the laser beam which engraves a relief of the inlay.

4. A process as claimed in claim 3 wherein the electronically scanned image of the art master is sharpened by software in the computer, and a text font is added to the scanned image.

5. A process as claimed in claim 3 wherein the base is mounted on a variable speed work table positioned under the laser beam, the movement of said work table being coordinated with the optical reader.

6. A process as claimed in claim 1 wherein the laser beam engraves the relief in two stages, the laser beam being de-focused during the first stage of engraving a partial depth of the relief of the second image.

7. A process as claimed in claim 6 wherein the laser beam is focused after the de-focused partial depth engraving is completed, and a full-depth engraving of the relief of the second image is made during the second stage.

8. A process as claimed in claim 7 wherein the inlay is an inlay wafer and the relief is engraved on one side of the wafer.

9. A process as claimed in claim 8 wherein the edges of the relief on the inlay wafer are trimmed, sanded, and adhesive is applied to the relief before the relief on the inlay wafer is juxtaposed in the engraved hollow in the base.

10. A process as claimed in claim 8 wherein a foundation of the relief on the inlay wafer, and a partial depth of the surface of the base are removed after the relief of the inlay wafer has been juxtaposed in the hollow in the base, thereby revealing an inlay image in the inlay base.

11. A process as claimed in claim 6 wherein the partial depth of the first stage of engraving of the relief on the inlay wafer has a tapered profile.

12. A process as claimed in claim 7 wherein the angle of taper of the partial depth of the relief is greater than the angle of taper of a lower portion of the relief engraved during the second stage.

13. A process as claimed in claim 1 wherein a floor of the hollow engraved in the base has thereon at least one glue escape recess.

14. A process as claimed in claim 1 wherein the hollow engraved in the base is a first hollow and the relief of the inlay that is engraved is a first relief, the first relief being juxtaposed in the first hollow, with a portion of the first relief extending above the surface of the base, the portion of the first relief extending above the surface then being sanded away to form a first inlay, and a second hollow corresponding in shape with a second positive image is laser engraved in the base, a second inlay relief corresponding in shape with a second negative mirror image is engraved from a material separate from the base and the second inlay relief is juxtaposed in the second hollow to form a second inlay in the base.

15. A process as claimed in claim 14 wherein a portion of the first inlay, a portion of the second inlay and a corresponding portion of the surface of the inlay base are sanded to expose a uniform level of first and second inlays and base.

16. A laser inlay process comprising:

(a) scanning an art master and recording the scanned art master in a computer;

(b) printing a copy of the computer stored art master to produce a first positive image;

(c) scanning said first image with an optical reader;

(d) coordinating a laser with said optical reader to cut a hollow engraving in a base corresponding with said first positive image;

(e) producing a mirror image of the computer stored art master;

(f) printing a copy of the mirror image to produce a second image;

(g) scanning said second image with the optical reader, said optical reader being reversed from positive to negative compared to the reading of the first image;

(h) coordinating the laser with the optical reader and engraving on an inlay wafer a relief image which corresponds with the negative mirror second image; and (i) juxtaposing the relief reproduction of the second image on the inlay wafer in the hollow engraving corresponding to the first positive image in the inlay base.

17. A method as claimed in claim 16 wherein an exposed portion of the inlay relief and a portion of the surface of the inlay base are sanded away to reveal a uniform level of inlay relief and inlay base.

* * * * *